United States Patent
Henson et al.

(10) Patent No.: US 9,475,497 B2
(45) Date of Patent: Oct. 25, 2016

(54) ELECTRIC IMPLEMENT POWER MANAGEMENT SYSTEM

(71) Applicant: DEERE & COMPANY, Moline, IL (US)

(72) Inventors: Robert A Henson, Apex, NC (US); Patrick W Cross, Cary, NC (US); Eric R Funk, Apex, NC (US)

(73) Assignee: DEERE & COMPANY, Moline, IL (US)

( * ) Notice: Subject to any disclaimer, the term of this patent is extended or adjusted under 35 U.S.C. 154(b) by 182 days.

(21) Appl. No.: 13/960,246

(22) Filed: Oct. 31, 2013

(65) Prior Publication Data

US 2015/0120148 A1    Apr. 30, 2015

(51) Int. Cl.

| | |
|---|---|
| *B60W 30/188* | (2012.01) |
| *B60W 10/30* | (2006.01) |
| *A01D 34/43* | (2006.01) |
| *A01C 19/02* | (2006.01) |
| *A01D 34/58* | (2006.01) |
| *B60W 10/06* | (2006.01) |
| *A01D 34/00* | (2006.01) |
| *B60L 1/00* | (2006.01) |
| *B60L 11/14* | (2006.01) |
| *A01D 101/00* | (2006.01) |

(52) U.S. Cl.
CPC .......... *B60W 30/1886* (2013.01); *A01C 19/02* (2013.01); *A01D 34/006* (2013.01); *A01D 34/58* (2013.01); *B60L 1/003* (2013.01); *B60L 11/14* (2013.01); *B60W 10/06* (2013.01); *B60W 10/30* (2013.01); *A01D 2101/00* (2013.01); *B60L 2200/22* (2013.01); *B60L 2200/40* (2013.01); *B60L 2240/12* (2013.01); *B60L 2240/461* (2013.01); *B60L 2250/26* (2013.01); *Y02T 10/70* (2013.01); *Y02T 10/7077* (2013.01)

(58) Field of Classification Search
CPC .. A01D 34/58; A01D 34/78; B60W 30/1886
See application file for complete search history.

(56) References Cited

U.S. PATENT DOCUMENTS

| | | | |
|---|---|---|---|
| 5,163,273 A | 11/1992 | Wojtkowski et al. | |
| 6,531,850 B1 | 3/2003 | Griffin et al. | |
| 6,655,233 B2 * | 12/2003 | Evans et al. | 74/731.1 |
| 6,675,577 B2 | 1/2004 | Evans | |
| 7,007,446 B2 | 3/2006 | Dettmann | |
| 7,594,377 B1 * | 9/2009 | Jansen et al. | 56/10.2 H |
| 7,735,592 B2 * | 6/2010 | Bellot et al. | 180/165 |
| 8,130,478 B2 | 3/2012 | Godbold et al. | |
| 8,863,485 B2 * | 10/2014 | Pitcel et al. | 56/10.2 R |

(Continued)

FOREIGN PATENT DOCUMENTS

| | | |
|---|---|---|
| EP | 2095702 A1 | 2/2009 |
| EP | 2239841 A2 | 10/2010 |

(Continued)

OTHER PUBLICATIONS

Search Report issued in counterpart European Application No. 14179791.0, dated Nov. 11, 2014 (6 pages).

*Primary Examiner* — Todd Melton

(57) ABSTRACT

An electric implement power management system includes an electronic controller that monitors total electric implement load and commands a transmission to reduce the speed of the traction drive wheels below the desired traction drive speed if the total electric implement load reaches a maximum allowable load.

13 Claims, 3 Drawing Sheets

(56) References Cited

U.S. PATENT DOCUMENTS

2011/0061355 A1* 3/2011 Griffin .................. A01D 34/58
 56/16.7
2012/0227368 A1 9/2012 Koike et al.

FOREIGN PATENT DOCUMENTS

| EP | 2420130 A1 | 2/2012 |
| WO | 2013/009311 A3 | 1/2013 |

* cited by examiner

ELECTRIC IMPLEMENT POWER MANAGEMENT SYSTEM

FIELD OF THE INVENTION

This invention relates to an electric implement power management system for multiple electric implements such as electric grass cutting reels or electric planters that are carried or pulled by work vehicles.

BACKGROUND OF THE INVENTION

Electric implements may be carried or pulled by work vehicles. For example, three or more electrically powered cutting reels may be carried by fairway mowers, greens mowers, trim mowers and other turf care products. Electric seeding equipment pulled by tractors may include multiple seeding row units having electric motors.

Electric power for these implements may be supplied by an alternator or generator driven directly by an internal combustion engine, or by an energy storage device or fuel cell charged by the alternator. Electric motors for the implements may include brush-less permanent magnet motors, commutated electric motors, or other electric motors.

With a typical alternator, particularly a Lundell-type alternator having an output rectifier, if more current is demanded than the alternator can supply, the alternator's output voltage may collapse, yet the current may not correspondingly increase. The alternator's electrical power output does not stay at the maximum available, but drops precipitously.

As a result, if current demand by multiple electrically powered implement motors is very high, approaching or exceeding the capacity of the power generating component, the electrical power may be significantly lower due to a sharp voltage drop. Once the voltage drops too far, it can be insufficient to power other electrical functions on the work vehicle, resulting in a condition commonly referred to as "brownout." Other power generating devices such as permanent magnet alternators, electrochemical batteries, DC machines and others suffer from overload problems of a type similar to the above. For example, electrochemical cells will undergo voltage collapse under high load conditions, particularly when the battery is highly discharged.

If the total electrical implement load reaches or exceeds the maximum allowable load, the implements may stall or fault and stop functioning. For the above reasons, it is desired to provide an electric implement power management system that reduces the peak power demands on an alternator. It is desired to provide an electric implement power management system that reduces peak power demands before total electric implement load reaches an overload condition.

SUMMARY OF THE INVENTION

An electric implement power management system includes an electronic controller that receives input regarding the electric load on the alternator and sets the transmission to a desired traction drive speed if the total electric load does not exceed a maximum allowable load, or to a reduced traction drive speed if the total electric load exceeds the maximum allowable value. The power management system reduces peak power demands on the alternator, and reduces the traction drive speed before reaching an overload condition.

DESCRIPTION OF THE PREFERRED EMBODIMENT

Figure 1:
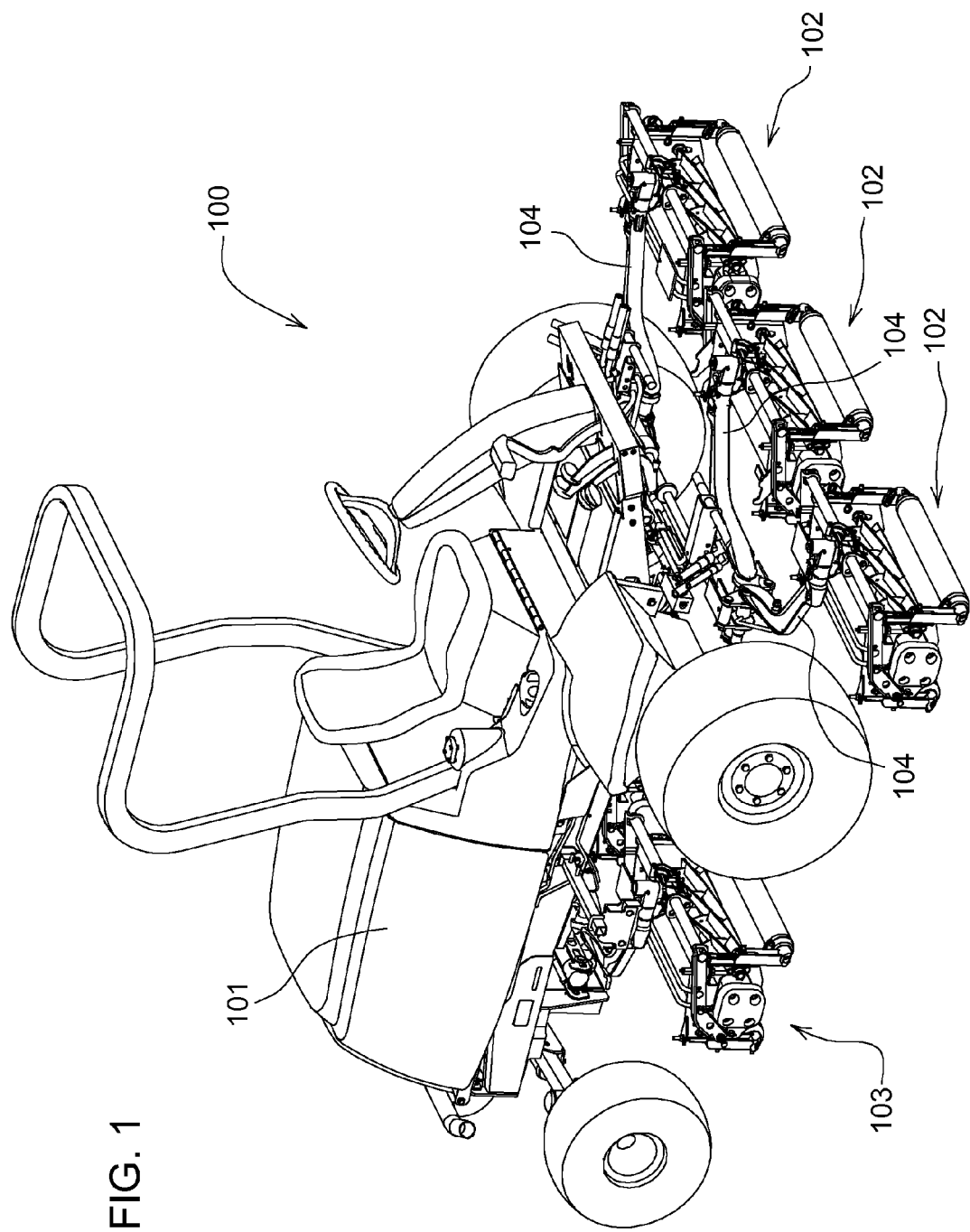
FIG. 1 is a perspective view of a fairway mower having an electric implement power management system according to a first embodiment of the invention.
Figure 2:
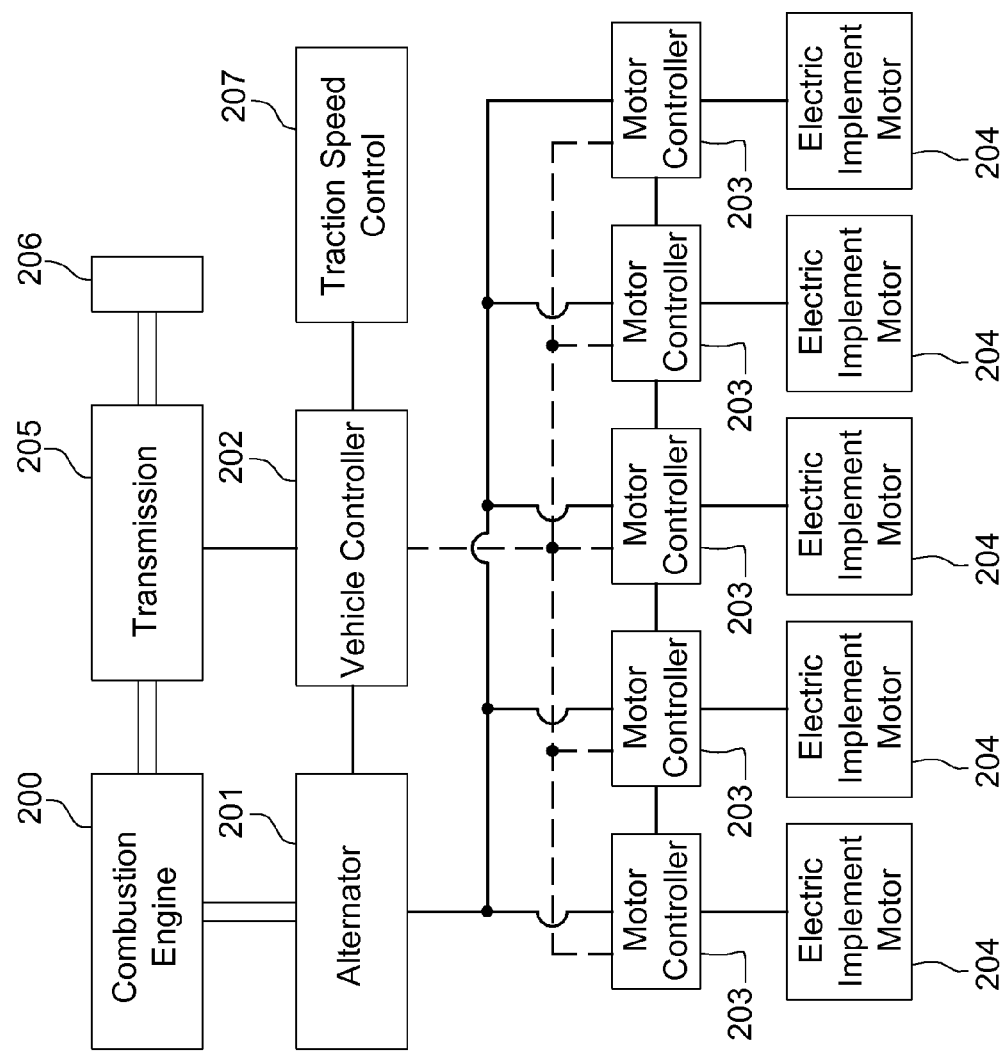
FIG. 2 is a block diagram of an electric implement power management system according to a first embodiment of the invention.

One embodiment of the electric implement power management system is shown in FIGS. 1 and 2 on fairway mower 100. The fairway mower may include traction vehicle 101 that carries a plurality of electrically powered reel-type cutting units 102, 103. The electric implement power management system is not limited to grass mowing machines such as fairway mowers, but also may be provided on other electrically powered implements such as electric planters having multiple row units that are carried or pulled by work vehicles such as tractors.

Now referring to FIG. 2, in one embodiment of the electric implement power management system, internal combustion engine 200 may mechanically drive generator or alternator 201 directly through a belt and pulley arrangement. Alternatively, the internal combustion engine may indirectly drive a generator or alternator through a hydraulic motor. Or the alternator may charge a battery or other storage device that powers electrically powered implements. The alternator may provide electric power to a plurality of electric implements such as electric implement motors 204 through motor controllers 203 electrically coupled to the alternator, or such as electric motors on multiple row units of a planter.

In one embodiment of the power management system, electronic controller 202 may be electrically coupled to a plurality of motor controllers 203. The electronic controller may be a vehicle controller that is provided on-board a work vehicle such as a grass mowing machine or tractor. The electronic controller may control the presence, absence or any other aspect of electrical energy to motor controllers 203 and electric implement motors 204. The electric implement load may be provided as an input to the electronic controller.

In one embodiment, the power management system may include an electronically controlled transmission 205 that transmits rotational power from internal combustion engine 200 to traction drive wheels 206 of the work vehicle. Alternatively, the power management system may include an electric power source and electric traction drive system connected to the drive wheels.

In one embodiment, the power management system may have a variable traction speed control 207 that an operator may use to set a desired traction drive speed of the work vehicle. For example, the variable traction speed control may be a pedal that is operatively engaged to a potentiometer or position sensor to produce a signal to controller 202 indicating a desired traction drive speed. If transmission 205 is a hydrostatic transmission, controller 202 may be signal-connected to a solenoid of a proportional pressure control valve. The output current that energizes the solenoid may be substantially proportional to the corresponding pedal position signal. For a given engine speed, controller 202 may command transmission 205 to rotate the wheels 206 at a desired traction speed based on position of the foot pedal.

Similarly, in the case of an electric traction drive system, the controller may command the wheels to rotate at a desired traction speed based on position of the foot pedal. However, if the controller detects the total electric implement load on the alternator exceeds a maximum allowable load, the controller may command the transmission or electric traction drive system to rotate the wheels at a lower desired traction speed for the same foot pedal position.

Figure 3:
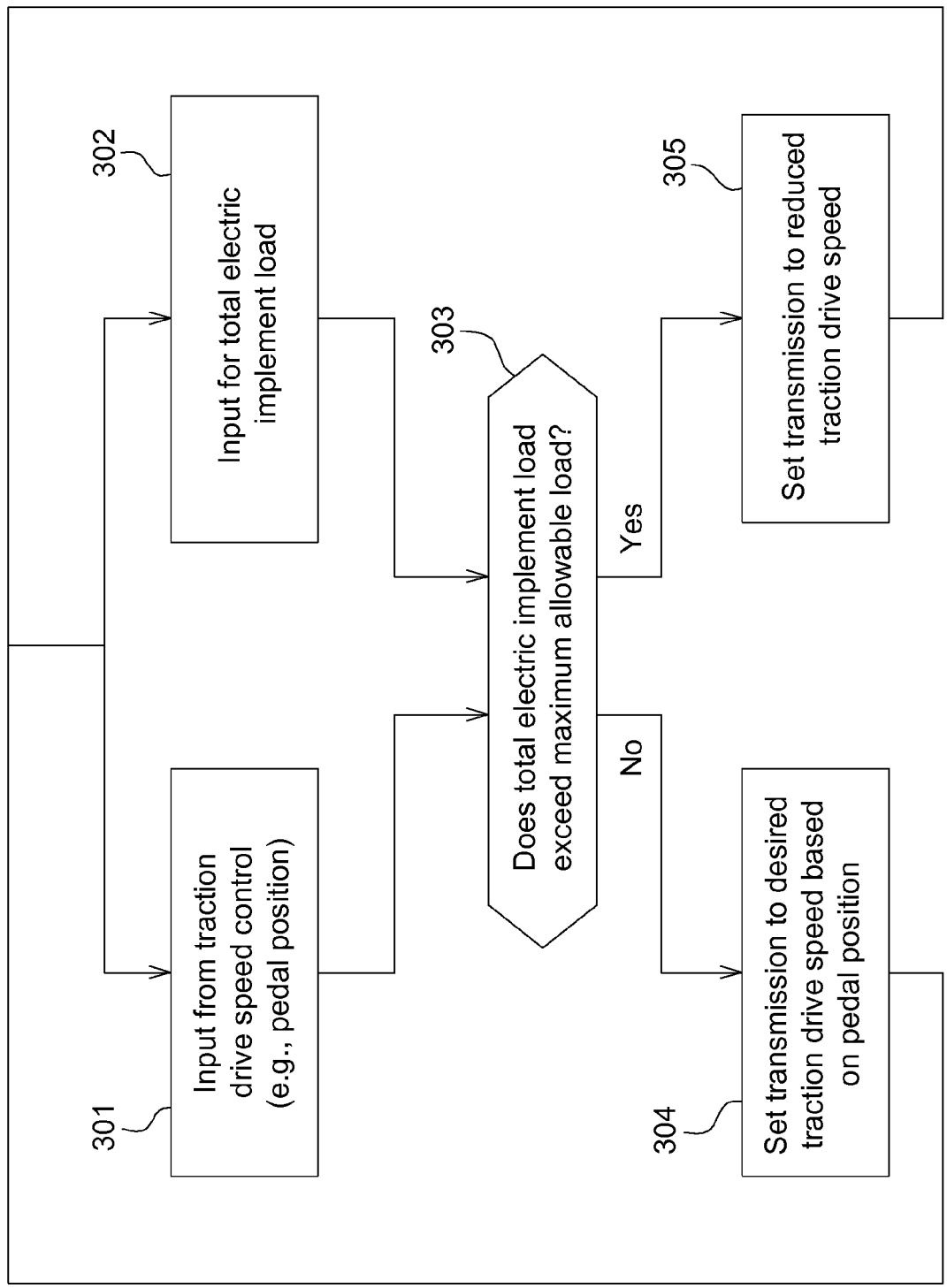
FIG. 3 is a logic diagram of an electric implement power management system according to the first embodiment.

In one embodiment, as shown in the flow diagram of FIG. 3, the electronic controller may receive input from the traction drive speed control (e.g., pedal position) in block 301. The electronic controller may monitor the alternator and receive input regarding the total electric implement load on the alternator in block 302. The electronic controller may determine the total electric implement load on the alternator by monitoring bus voltage, bus current, and/or the regulator output from the alternator field voltage line.

In one embodiment, the electronic controller may determine if the total electric implement load is at or over a maximum allowable load in block 303. For example, the electronic controller may determine the total electric implement load is at or over the maximum allowable load if bus voltage is below a specified preset voltage. In the case of a 48V or 56V alternator, the controller may determine the total electric implement load is at or over the maximum if bus voltage is below a lower specified preset voltage such as 43 volts or 50 volts respectively. Similarly, the electronic controller may determine the total electric implement load is at or over the maximum if bus current is above a specified preset current limit such as 270 amps. Alternatively, the electronic controller may monitor the regulator output from the alternator field voltage line. The regulator may switch the alternator field voltage line on and off depending on the bus voltage. The electronic controller may determine that the total electric implement load is at or over the maximum allowable load if the regulator turns on the alternator field voltage line at close to or approaching 100%.

If the electronic controller determines the total electric implement load does not exceed the maximum allowable load, the electronic controller may set the transmission to the desired traction speed as a function of pedal position in block 304. If the electronic controller determines the total electric implement load exceeds the maximum allowable load, the electronic controller may set the transmission to a reduced traction drive speed in block 305. The reduced traction drive speed may be a function of pedal position, or may be a function of the difference between the total electric implement load and the maximum allowable load. The electronic controller may continue to command the transmission at the reduced traction drive speed as long as the total electric implement load continues to exceed the maximum allowable load. For example, the reduced traction drive speed may be only 50% or 75% of the speed input based on the position of traction speed control 207, depending on operation conditions.

Having described a preferred embodiment, it will become apparent that various modifications can be made without departing from the scope of the invention as defined in the accompanying claims.

The invention claimed is:

1. An electric implement power management system, comprising:
    a traction vehicle having an internal combustion engine driving an alternator;
    a plurality of electric motors powered by the alternator, each electric motor connected to an electrically powered implement and to the alternator through a motor controller;
    an electronically controlled transmission providing rotational power from the internal combustion engine to traction drive wheels; and
    an electronic controller receiving a desired traction drive speed input from the position of an operator control and a bus voltage input specifying total electric implement load on the alternator, the electronic controller setting the transmission to the desired traction drive speed if the total electric implement load is below a maximum allowable load, and to a reduced traction drive speed if the total electric implement load is at or exceeds the maximum allowable load.

2. The electric implement power management system of claim 1 wherein the electronic controller receives input from a traction drive speed control pedal.

3. The electric implement power management system of claim 1 wherein the implements are cutting reels.

4. The electric implement power management system of claim 1 wherein the implements are seeding row units.

5. The electric implement power management system of claim 1 wherein the transmission is a hydrostatic transmission.

6. An electric implement power management system, comprising:
    an electronic controller connected to a traction speed control, to an alternator providing electrical power to a plurality of electrically powered implements, and to a transmission providing rotational power from a power source to traction drive wheels;
    the electronic controller receiving an input regarding desired traction drive speed from an operator control and a bus current input specifying total electric load of the plurality of implements on the alternator; the electronic controller commanding the transmission to reduce the speed of the traction drive wheels below the desired traction drive speed if the total electric load of the implements reaches a maximum value.

7. The electric implement power management system of claim 6 wherein the electrically powered implements are a plurality of cutting reels.

8. The electric implement power management system of claim 6 wherein the electrically powered implements are a plurality of seeding row units.

9. The electric implement power management system of claim 6 further comprising a motor controller for each implement.

10. The electric implement power management system of claim 6 wherein the traction speed control is an operator actuated pedal.

11. An electric implement power management system, comprising:
    a variable traction speed control including an operator actuated foot pedal that sets a desired traction drive speed; the variable traction speed control operatively engaged to a position sensor to produce a signal to a controller indicating a desired traction drive speed; the controller being signal-connected to a solenoid of a proportional pressure control valve and providing output current that energizes the solenoid substantially proportional to a corresponding pedal position signal to achieve a desired traction speed based on position of the foot pedal for a given engine speed;

the controller providing output current that energizes the solenoid at a different proportion to the pedal position signal to achieve a traction speed below the desired traction speed if the controller detects a regulator output on an alternator field voltage line specifying total electric implement load of a plurality of electric powered implements at or above a maximum allowable load.

12. The electric implement power management system of claim 11 wherein the electrically powered implements are a plurality of cutting reels.

13. The electric implement power management system of claim 11 further comprising an internal combustion engine that mechanically drives an alternator that provides electric power to the electrically powered implements.

\* \* \* \* \*